(12) United States Patent
Fu

(10) Patent No.: US 10,713,302 B2
(45) Date of Patent: Jul. 14, 2020

(54) SEARCH PROCESSING METHOD AND DEVICE

(71) Applicant: Tencent Technology (Shenzhen) Company Limited, Shenzhen (CN)

(72) Inventor: Hongcheng Fu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 158 days.

(21) Appl. No.: 15/951,081

(22) Filed: Apr. 11, 2018

(65) Prior Publication Data

US 2018/0232461 A1 Aug. 16, 2018

Related U.S. Application Data

(63) Continuation-in-part of application No. PCT/CN2017/070970, filed on Jan. 12, 2017.

(30) Foreign Application Priority Data

Jan. 12, 2016 (CN) .......................... 2016 1 0019595

(51) Int. Cl.
  *G06F 16/903* (2019.01)
  *G06F 16/9032* (2019.01)
  (Continued)

(52) U.S. Cl.
  CPC .... *G06F 16/90344* (2019.01); *G06F 16/9032* (2019.01); *G06F 16/9535* (2019.01);
  (Continued)

(58) Field of Classification Search
  USPC .......................................................... 707/706
  See application file for complete search history.

(56) References Cited

U.S. PATENT DOCUMENTS

2008/0294618 A1* 11/2008 Hamilton, II ......... G06F 16/338
2008/0294619 A1* 11/2008 Hamilton, II ....... G06F 16/3326
(Continued)

FOREIGN PATENT DOCUMENTS

CN 102693310 A 9/2012
CN 102833594 A 12/2012
(Continued)

OTHER PUBLICATIONS

Tencent Technology, ISR, PCT/CN2017/070970, Apr. 17, 2017, 2 pgs.
(Continued)

*Primary Examiner* — Hung T Vy
(74) *Attorney, Agent, or Firm* — Morgan, Lewis & Bockius LLP

(57) ABSTRACT

This application discloses a searching processing method performed by an apparatus. The apparatus generates at least one searching character variable sentence pattern corresponding to each historical searching character string and accumulates a quantity of generating times corresponding to a searching character variable sentence pattern not belonging to a common searching sentence pattern set. Next the apparatus adds a searching character variable sentence pattern whose quantity of generating times reaches a first preset threshold of a quantity of times to the common searching sentence pattern set and determines a searching character variable sentence pattern belonging to the common searching sentence pattern set in the searching character variable sentence pattern corresponding to a current searching character string, and sends corresponding searching result data to a client. By means of this application, accuracy of recognizing a searching character string can be improved to satisfy expectations of a user.

17 Claims, 4 Drawing Sheets

(51) Int. Cl.
  *G06F 16/9535* (2019.01)
  *G06F 40/20* (2020.01)
  *G06F 40/53* (2020.01)
  *G06F 40/211* (2020.01)
  *G06F 40/295* (2020.01)

(52) U.S. Cl.
  CPC ............ *G06F 40/20* (2020.01); *G06F 40/211* (2020.01); *G06F 40/295* (2020.01); *G06F 40/53* (2020.01)

(56) References Cited

U.S. PATENT DOCUMENTS

2012/0130978 A1   5/2012   Li et al.
2016/0085757 A1*  3/2016   Rachi ................. G06F 16/3322
                                              707/727
2019/0163754 A1*  5/2019   Huang ................ G06F 16/2386

FOREIGN PATENT DOCUMENTS

| | | |
|---|---|---|
| CN | 102855252 A | 1/2013 |
| CN | 103514189 A | 1/2014 |
| CN | 104199825 A | 12/2014 |
| CN | 104216942 A | 12/2014 |
| JP | 2008287394 A | 11/2008 |
| JP | 4950755 B2 | 6/2012 |
| JP | 2013120547 A | 6/2013 |
| JP | 5774459 B2 | 9/2015 |

OTHER PUBLICATIONS

Tencent Technology, Written Opinion, PCT/CN2017/070970, dated Apr. 17, 2017, 5 pgs.
Tencent Technology, IPRP, PCT/CN2017/070970, Jul. 17, 2018, 6 pgs.

* cited by examiner

SEARCH PROCESSING METHOD AND DEVICE

RELATED APPLICATION

This application is a continuation-in-part application of PCT/CN2017/070970, entitled "SEARCH PROCESSING METHOD AND DEVICE" filed on Jan. 12, 2017, which claims priority to Chinese Patent Application No. 201610019595.4, filed with the State Intellectual Property Office of the People's Republic of China on Jan. 12, 2016, and entitled "SEARCH PROCESSING METHOD AND DEVICE", both of which are incorporated herein by reference in their entirety.

FIELD OF THE TECHNOLOGY

This application relates to the field of Internet technologies, and in particular, to a searching processing method and apparatus.

BACKGROUND OF THE DISCLOSURE

With the development of Internet and electronic devices, more users choose to search for and listen to songs via Internet. For example, when a user enters "Andy Lau (a famous singer in China)" in a search field by means of a client, a server may return information about songs of "Andy Lau" to the client. As can be seen, users can listen to various songs more conveniently by searching for songs via the Internet. However, when a searching character string entered by a user is colloquial, the searching character string cannot be recognized accurately in a current song searching manner, and consequently, information about found songs cannot fully satisfy expectations of the user. For example, if a searching character string entered by the user is "I want to search for Red of Leslie Cheung (a famous singer in China)", both "I (the Chinese character corresponding to "I" is the same as the Chinese character of "wo")" and "Red" may be recognized as songs of Leslie Cheung according to the current song searching manner, and a click rate of the song "I" is higher than a click rate of song "Red", that is, a priority of the song "I" is higher. Therefore, the song "I" may be output to the user according to the current song searching manner. However, apparently, the user does not search for the song "I", but searches for the song "Red". As can be seen, the searching character string cannot be recognized accurately according to the current song searching manner.

SUMMARY

Embodiments of this application provide a searching processing method and apparatus, to gradually build up a database of search templates for media content (e.g., songs, music videos, movies, etc.) that is continually updated and that is adaptive to new media content and trending colloquial usage, to improve accuracy of recognizing a searching character string (e.g., a search entered via natural language speech input and/or shorthand, colloquial expressions of a search request), and ensure that a searching result can satisfy expectations of a user.

An embodiment of this application provides a searching processing method performed by a computing device. After obtaining at least one historical searching character string collected within a first time interval, the computing device generates at least one searching character variable sentence pattern corresponding to each of the at least one historical searching character string according to a preset searching character variable set. Next the computing device accumulates a quantity of generating times corresponding to a searching character variable sentence pattern not belonging to a preset common searching sentence pattern set in the generated searching character variable sentence pattern and adds a searching character variable sentence pattern whose quantity of generating times reaches a first preset threshold of a quantity of times to the common searching sentence pattern set. When a current searching character string sent by a client is obtained, the computing device determines a searching character variable sentence pattern belonging to the common searching sentence pattern set in at least one searching character variable sentence pattern corresponding to the current searching character string as a target searching character variable sentence pattern and sends searching result data corresponding to the target searching character variable sentence pattern to the client.

Correspondingly, an embodiment of this application further provides a searching processing apparatus including a memory configured to store a device control application, and a processor configured to invoke the device control application. After obtaining at least one historical searching character string collected within a first time interval, the apparatus generates at least one searching character variable sentence pattern corresponding to each of the at least one historical searching character string according to a preset searching character variable set. Next the apparatus accumulates a quantity of generating times corresponding to a searching character variable sentence pattern not belonging to a preset common searching sentence pattern set in the generated searching character variable sentence pattern and adds a searching character variable sentence pattern whose quantity of generating times reaches a first preset threshold of a quantity of times to the common searching sentence pattern set. When a current searching character string sent by a client is obtained, the apparatus determines a searching character variable sentence pattern belonging to the common searching sentence pattern set in at least one searching character variable sentence pattern corresponding to the current searching character string as a target searching character variable sentence pattern, and sends searching result data corresponding to the target searching character variable sentence pattern to the client.

In the embodiments of this application, when a first preset time interval arrives, at least one historical searching character string collected within the first time interval is obtained, so that at least one searching character variable sentence pattern corresponding to each of the at least one historical searching character string can be generated according to a preset searching character variable set, a quantity of generating times corresponding to a searching character variable sentence pattern not belonging to a preset common searching sentence pattern set in the generated searching character variable sentence pattern can be accumulated, and a searching character variable sentence pattern whose quantity of generating times reaches a first preset threshold of a quantity of times can be added to the common searching sentence pattern set, to ensure that a searching character variable sentence pattern in the common searching sentence pattern set is a commonly used sentence pattern. That is, it indicates that the searching character variable sentence pattern in the common searching sentence pattern set is a sentence pattern better satisfying intention of a user. Therefore, when a current searching character string sent by a client is obtained, a searching character variable sentence pattern belonging to the common searching sentence pattern set in at least one searching character variable sentence pattern corresponding to the current searching character string can be determined as a target searching character variable sentence pattern, and searching result data corresponding to the target searching character variable sentence pattern can be sent to the client. Because the target searching character variable sentence pattern is a sentence pattern most satisfying the intention of the user, accuracy of recognizing a current searching character string can be improved, to ensure that a searching result can satisfy expectations of the user.

BRIEF DESCRIPTION OF THE DRAWINGS

To describe the technical solutions in the embodiments of this application or in the conventional technology more clearly, the following briefly introduces the accompanying drawings required for describing the embodiments or the conventional technology. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
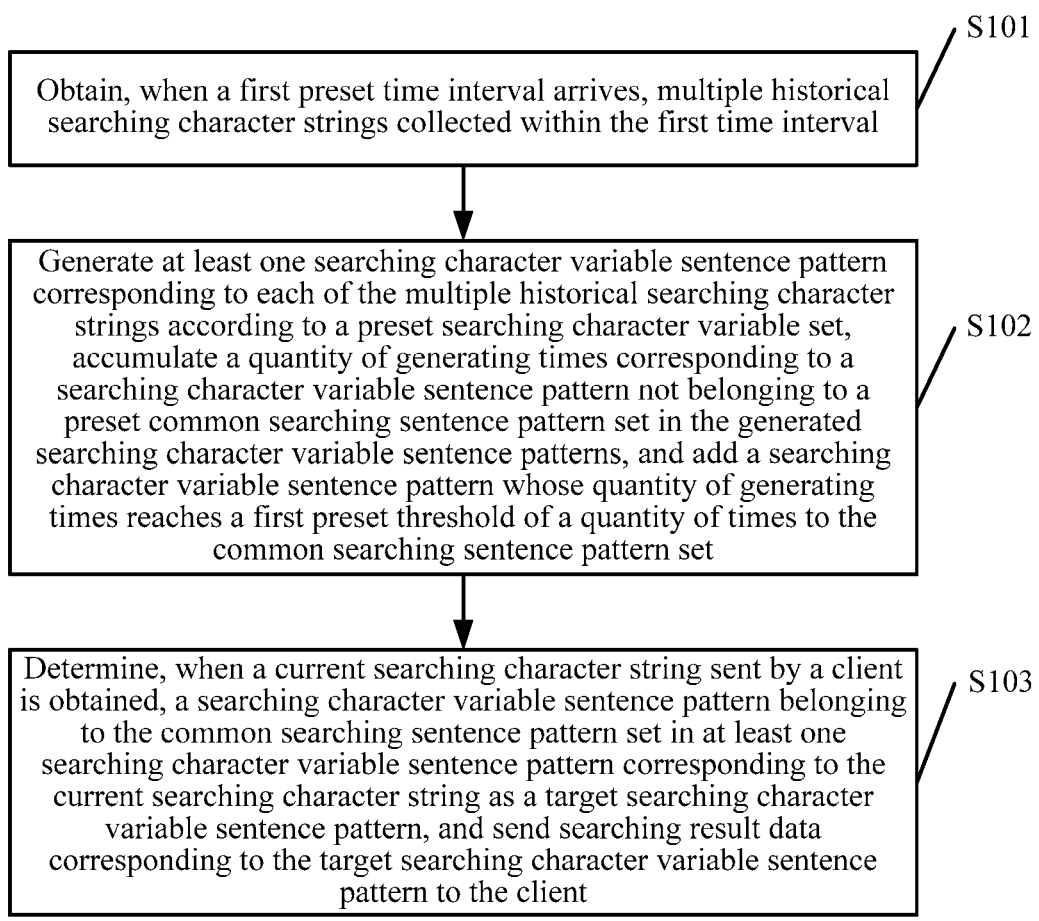
FIG. 1 is a schematic flowchart of a searching processing method according to an embodiment of this application.

The following clearly and completely describes the technical solutions in the embodiments of this application with reference to the accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

As set forth in the background section, media search presents particular challenges as the names of media content objects are frequently parts of a regular sentence or expression themselves, and when mixed within a natural language or colloquial search request, it is difficult for a natural language processing engine to correctly identify the sentence structure and the key search terms from the original user input, and return the results that the users are actually interested in. For example, if a song is called "I want to fly" and the user's search input is "I want to find I want to fly", the traditional natural language processing engines will fail to identify the proper key words in the input, and may return irrelevant results to the user. Furthermore, frequently, the names of artists and songs are very short, which may be omitted in the input processing process. For example, if the song is called "I wish", and the user's search input is "Find I wish". The natural language processing engine may mistake the phrase "I wish" as superfluous, and ignore them in the actual search performed based on keywords identified in the search input. Furthermore, in the Chinese language, artists names are often made of individual characters that each convey their own meanings, and may further confuse the natural language processing engine when segmenting the search input, cause irrelevant search results to be retrieved. Sometimes, if a user simply enters the name of the song with or without additional phrasing, the name of the song may be mistakenly interpreted as a request rather than a keyword. For example, if there is a movie called "Search for Hope" which is about a search for a person named "Hope", the parsing of the search input would treat "Hope" as the item to be found, and ignore the words "search for" and return the wrong results (e.g., a song titled "Hope").

Furthermore, when search input is entered into the search engine, it is difficult to predict beforehand whether the user is using a keyword search style without regular grammar structures, or using a natural language style to input a request or query with superfluous components, or colloquial language or word usage. A more flexible analysis (e.g., an analysis that is not entirely based on grammar, syntax, or keyword matching) is needed to process these search inputs to derive the correct intent of the user using machine processing without human assistance.

Manually parsing each search input is also not practicable because the number of media items that are coming out to the public each day is tremendous, and a human being simply cannot keep up with that information growth rate. Furthermore, the man power needed to build a natural language processing engine that would be updated constantly with a growing corpus of names of songs and artists used in different kinds of sentences is enormous, and the training of machine learning models using the updated corpus may skew the accuracy of data processing for search inputs related to existing songs and artists.

For at least these reasons, a completely new ways of processing media search inputs in Chinese is needed.

In the methods described herein. A database of basic search input patterns are gradually built up based on new search inputs that are coming into the search system. Initially, a skeleton database is created by taking a plurality of historic search inputs and replace the characters in each of the historic search inputs with corresponding variable names such that the historic search input becomes a concatenation of variable names (e.g., a concatenation of variable names expressed in Chinese characters (e.g., "歌曲" ("song"), "歌手" ("artist"), "要" ("want"), "的" ("of", "by"), "前缀" ("prefix", such as hi, please, etc.), "后缀" ("suffix", such as, thanks", that's it, etc.) sandwiched between two delimiter symbols (e.g., "%")). Each of the variable names corresponds to a listing of known names or expressions in Chinese characters that serves the function that corresponds the variable name. For example, the variable "song" corresponds to a listing of media item titles (e.g., titles of songs, movies, and books). The listing of media item titles optionally includes different versions of the titles and colloquial names of the titles. The variable "artist" includes a listing of known names for artists corresponding to one or more media items in the media item listing. The listing of artist names optionally includes different versions of the names (e.g., nicknames, shortened names, stage names and real names, etc.) and colloquial names of the artist names. The variable "want" corresponds to a listing of words and phrases that express the desire to search for, such as "I want to find", "Find" "I want", "Show me", "Locate", "I am interested in" etc. The variable for "of/by" corresponds to a listing of grammar components that indicates connections and relationships, such as "of", "by", "'s" "produced by", "adapted by" etc. The variable for "prefix" corresponds to a listing of phrases for greetings, address, pleasantries, etc. The variable for "suffix" corresponds to a listing of phrases for closure, appreciation, gratitude, etc. The listings do not have to be exhaustive and complete at this point, and the listing will grow overtime based on additional new search inputs that are received. The database of search input patterns are also not exhaustive and complete in the beginning, and provides a starting point for refined and growth.

Once the database of search input patterns are initialized and the listings for the variables are populated with entries consisting of characters or strings of characters, new search inputs are parsed and segmented according to these existing search input patterns that each is a concatenation of a set of variables in a particular order. In some embodiments, the new search inputs are inputs subsequently received by the search engine. In some embodiments, the new search inputs are also historic inputs that have not been processed using the above patterns. The building of the initial database of search input patterns is relatively easy, and the system will be able to start from a small number of input patterns and gradually grow the database based on the following steps.

In some embodiments, for each new search input that has been received, the system processes the new input by matching the new search input to each of the existing search input patterns. The new search input is segmented in various ways without consideration to regular grammar or syntax rules of a natural language processing engine, to determine whether a complete match can be obtained using the existing listings of variable values for the existing set of variables. A complete match is defined as successful replacement of all characters in the search input string with corresponding variables. In other words, if the system is able to identify a way to segment the search input string such that each segment of the search input string can be found in a listing that corresponds to a respective variable name, the system replace the segment with the respective variable name, so that the search input string becomes a concatenation of existing variable names in a particular order that is dictated by the order of the segments in the original search string. For example, if the search input is "我要找张国荣的红" (translated as "I want to find Red by Lesley Chang", and includes the string of characters for "I want to find" "Lesley Chang" "of" and "Red"). The string is segmented as "我要找张国荣的红", and when the segments are replaced by corresponding variable names, the resulting string is "%want%%artist%%of%%song%". The system saves this concatenation of variable names as a potential candidate search input pattern, and sets up a counter for the potential candidate search input pattern. If a subsequent new search input also produces the same concatenation of variable names after the above processing, the counter for this potential candidate search input pattern is incremented. When the counter of the candidate search input pattern reaches a predefined threshold value (e.g., 1000), the systems adds the candidate search input pattern into the database of search input patterns. Frequently, the system may identify multiple ways to segment a new search input that would result in a complete match using the existing listings of variable values for the existing set of variables; therefore, the system is able to generate multiple concatenated string of variable names, each concatenated string of variable names corresponding to a respective way of segmenting the search input. The multiple concatenated strings of variable names are all saved as potential candidate search input patterns and given respective counters. When new search inputs are processed, different candidate search input patterns' counters would be updated by the system at different rates because some of the candidate patterns resulted from coincidence in particular combinations of variable values rather than a true query pattern that is generally applicable. In some embodiments, when the counter for a particular candidate search input pattern has reached a predefined threshold, the system provides the candidate search input pattern to a human user to for the human user to determine if the candidate search input pattern should be added to the database. Since the counter is set at a relatively high value, only the most promising candidate is presented for human review, thus saving time and human resources on producing an accurate search input pattern database. The system receives a user's input regarding whether the candidate search input pattern is a true pattern or a garbage pattern that should be discarded, and the system either adds the candidate search input pattern to the database or discard it. In some embodiments, the system adds the garbage pattern into a blacklist, such that whenever a new candidate search input pattern is generated based on the above process, the system compares the new candidate search input pattern to the blacklist. The system discards the candidate search input pattern without creating a counter for the candidate search input if a match is found in the blacklist, and proceeds to create the counter for the candidate search input if no match is found in the blacklist. In some embodiments, if the new search input is processed and one of the resulting concatenations of variable names is found among the existing search input patterns in the database, then all the other resulting concatenations are discarded without saving them as candidate search input patterns and search results are returned based on keyword search using the keywords in the search input string that correspond to "song" and "artist" variables. In some embodiments, even if one of the ways to segment the search input string resulted in a concatenated string of variable names that already exist in the database of search input patterns, the other resulting concatenated string of variables corresponding other ways of segmenting the search input string are still saved as candidate search input patterns and evaluated using future search inputs. In some embodiments, the other concatenated strings of variable names are only saved as candidate search input patterns if the user's response to the search results indicate a dissatisfaction of the search results (e.g., the user performing the search again immediately using a slightly different phrasing with many of the same keywords as a previous search input). The above discussion is related to scenarios where complete matches were found when segmenting the new search input and substituting the segments with variable names. Sometime, incomplete match is found instead. For example, when segmenting the search input in a particular manner allows the system to substitute most of the segments with respective variable names, except for one contiguous segment of one or more characters, a partial match is considered to be found by the system, the partial match is defined as the concatenation of the variable names that can be substituted in and the one contiguous segment in the order corresponding to the original order of the segments in the search input. The partial match is saved as a candidate search input pattern. For example, before "要找" is added to the listing of values for the variable "want", the search input string "要找张国荣的红" (translated as "want to find Red by Lesley Chang", and includes the string of characters for "want to find" "Lesley Chang" "of" and "Red") can be segmented as "要找-张国荣-的-红", and when the segments are replaced by corresponding variable names, the resulting string is "要找%artist%%of%%song%". This concatenated variable string with a fixed segment is saved as a potential candidate search input pattern by the system with a respective counter.

When additional search input are processed in the manner set forth above, and if the resulting partial match that is identical to this saved candidate search input pattern, the system increment the counter associated with this candidate search input string. When the counter value exceeds a predefined threshold (e.g., a threshold that is different from the threshold used for the full match candidates) (e.g., 100), the system provides the candidate search input pattern to a human user to for the human user to determine if the candidate search input pattern should be added to the database. Since the counter is set at a relatively high value, only the most promising candidate is presented for human review, thus saving time and human resources on producing an accurate search input pattern database. The system receives a user's input regarding whether the candidate search input pattern is a true pattern or a garbage pattern that should be discarded, and the system either adds the candidate search input pattern to the database or discard it. In some embodiments, the system adds the garbage pattern into a blacklist, such that whenever a new candidate search input pattern is generated based on the above process, the system compares the new candidate search input pattern to the blacklist. The system discards the candidate search input pattern without creating a counter for the candidate search input if a match is found in the blacklist, and proceeds to create the counter for the candidate search input if no match is found in the blacklist. In some embodiments, even if one of the ways to segment the search input string resulted in a concatenated string of variable names that already exist in the database of search input patterns, the other resulting concatenated string of variables plus a fixed segment corresponding other ways of segmenting the search input string are still saved as candidate search input patterns and evaluated using future search inputs. In some embodiments, the other concatenated strings of variable names plus respective fixed segments are only saved as candidate search input patterns if the user's response to the search results indicate a dissatisfaction of the search results (e.g., the user performing the search again immediately using a slightly different phrasing with many of the same keywords as a previous search input). In some embodiments, once the human evaluation returns a confirmation that the candidate search input pattern is a real search input pattern, the fixed segment is also added to a corresponding listing of a respective variable. In the above example, "要找" is added to the listing of character strings for the variable "want", once the threshold is met by the counter of "要找%artist%%of%%song%". In some embodiments, the human user provides the input that identifies the correct variable name into the listing of which the fixed segment should be added. In some embodiments, if the human user cannot identify an existing variable name to correspond to the fixed segment, the human user provides a new variable name for the fixed segment to the system, and the system adds the new variable name to the set of existing variable names. Based on the above process, the database of search input patterns, the respective listings of the existing variables, and the set of existing variables all grow gradually based on the new search inputs that are entered by users overtime. The human intervention is limited, as a majority of false patterns are never presented to the human user. In some embodiments, the counter is reset after a predefined period of time, so that candidate patterns that do not receive enough matches are discarded, freeing up storage space for new candidate patterns. In some embodiments, a blacklist of discarded patterns are saved for preventing them from being false candidates again. In some embodiments, a timer is set for each blacklisted candidate, when the timer runs out, the blacklisted candidate is removed from the blacklist, and they can become candidate search input patterns again if they are found for subsequent search inputs again. This helps to accommodate changes in the real world where new names of artists, media items, and new colloquial usage of language develops.

In some embodiments, based on the existing search input patterns in the database, and the existing listings of values for each existing variable in the set of existing variables, new search input is processed. In some embodiments, when processing a new search input to return a set of relevant search results, the system segments the input string in a number of ways to determine if there are one or more ways to segment the input string such that the segments in the input string can all find a corresponding value in the listing of a respective variable in the set of existing variables. If so, a complete match is found for this particular segment, and the input string is converted to a concatenated string of variable names by replacing each segment with the variable name for which the listing includes a match for the segment. In accordance with a determination that only one complete match for the search input is obtained, then the system uses values of the "song" (e.g., 红 "Red") and "artist" (张国荣 "Lesley Chang") variables as the search keywords to retrieve results. In accordance with a determination that multiple complete matches for the search input is obtained, then the system compare the popularity of the values for the "song" and "artist" variables in the multiple matches to determine which pairs of "song" and "artist" values have the highest popularity scores based on recent searches entered by users. In some embodiments, when the same value in a search input is substituted with the "song" variable in one concatenated variable string, and is substituted with the "artist" variable in another concatenated variable string (e.g., when the artist uses his own name as a song's name or album's name), the system compares the click rate for the song and the artist, respectively, and uses the one with the higher click rate as the correct substitution.

In some embodiments, the search input accumulated each day (or each week, or other predefined time period) are processed using the method set forth above to identify new candidate search input patterns, new values of existing variable names, new variable names and values, and new search input patterns to add to the existing database, and used for processing for subsequent search inputs. The database become more and more accurate and complete overtime. Also, as new songs, new artists, new expressions become popular, the database continuously adapt to the new information, and continue to produce correct segmentations that are not constrained by the grammar and syntax rules of the conventional search input processing technology.

In some embodiments, every certain period of time (e.g., every month or every quarter), the existing search input patterns in the database are evaluated. For example, each existing search input pattern in the database has a corresponding counter, and each time a new input string is matched to a respective existing input pattern, the counter for the search input pattern is incremented. In some embodiments, if the search input pattern is the only complete match for a search input, the system increment the counter for the search input pattern by a greater value than if the search input pattern was one of several search input patterns that were also complete match for the search input. In some embodiments, the counter values for all the existing search input patterns are evaluated at the end of each predefined evaluation period (e.g., end of every month or quarter), and if the counter value is below a predefined value (e.g., 0, 1, 5, 10, 100 etc.), the search input pattern is removed from the database of existing search input patterns. Similarly, a counter can be set for each value in each listing of values for each existing variable name, a counter can be set for each existing variable name, as well, and incremented whenever where is a match to it in a search input. The existing values in each listing, and each existing variable value are also evaluated periodically, and entries whose counter value is lower than a threshold are removed because they may have become obsolete (e.g., the artist or song related to the search is no longer popular, and expression is no longer used by people, etc.). This helps keep the database update to date and lean and efficient.

Referring to FIG. 1, FIG. 1 is a schematic flowchart of a searching processing method according to an embodiment of this application. The method may include the following steps.

S101. Obtain, when a first preset time interval arrives (e.g., an end of a predefined evaluation period (e.g., end of each day, each week, etc.)), at least one historical searching character string collected within the first time interval. For example, all search input strings received during the evaluation period are gathered and processed as below to identify candidate search input patterns and promoting existing candidate search input patterns to become actual search input patterns in the database.

Specifically, a server may obtain, when the first preset time interval arrives, the at least one historical searching character string collected within the first time interval. The at least one historical searching character string may be all user searching corpora entered and uploaded by all clients within the first time interval. For example, if the first time interval is set to one day, the server obtains, once a day, at least one historical searching character string collected within the day.

S102. Generate at least one searching character variable sentence pattern (e.g., a concatenated string of variable names if complete matches are found, or a concatenated string of variable names plus a fixed segment of character(s)) corresponding to each of the at least one historical searching character string according to a preset searching character variable set (e.g., the set of existing variable names, the listing of values for each of the existing variable names), accumulate a quantity of generating times (e.g., a counter that is incremented whenever the same concatenated string of variable names or the same concatenated string of variable names plus the same fixed segment of character(s) are found in a respective historical search input) corresponding to a searching character variable sentence pattern not belonging to a preset common searching sentence pattern set (e.g., the database of existing search input patterns) in the generated searching character variable sentence pattern, and add a searching character variable sentence pattern whose quantity of generating times reaches a first preset threshold of a quantity of times to the common searching sentence pattern set.

Specifically, the searching character variable set may include at least one character variable, and each character variable includes a searching character associated with the character variable. For example, character variables included in the searching character variable set are separately "%singer%", "%song%", "%want%", "%of%", "%prefix%", and "%suffix%". Searching characters included in the character variable "%singer%" may be names of all singers in a background music library. Searching characters included in the character variable "%song%" may be names of all songs in the background music library. Searching characters included in the character variable "%want%" may be separately phrases such as "I want to search for", and "want to search for", and meanings of the searching characters are similar to that of the character variable "%want%". Searching characters included in the character variable "%of%" may be separately "of", "and", and the like, and meanings of the searching characters are similar to that of the character variable "%of%". Searching characters included in the character variable "%prefix%" may be separately "hello", "could you please", and the like, and meanings of the searching characters are similar to that of the character variable "%prefix%". Searching characters included in the character variable "%suffix%" may be separately "thanks", "thank you very much", and the like, and meanings of the searching characters are similar to that of the character variable "%suffix%". Therefore, the server may recognize the at least one historical searching character string according to the searching character included in each character variable in the searching character variable set, to split each historical searching character string into at least one segmentation character, and generate at least one searching character variable sentence pattern corresponding to each historical searching character string according to a character variable corresponding to the at least one segmentation character in each historical searching character string. Each searching character variable sentence pattern includes one or more character variables. For example, if a historical searching character string is "I want to search for Red of Leslie Cheung", "I want to search for Red of Leslie Cheung" may be split into multiple segmentation characters: "I want to search for", "Red", "of", and "Leslie Cheung" according to the searching character variable set. Because "I want to search for" corresponds to the character variable "%want%", "Leslie Cheung" corresponds to the character variable "%singer%", "of" corresponds to the character variable "%of%", and "Red" corresponds to the character variable "%song%", a corresponding searching character variable sentence pattern "%want%%song%%of%%singer%" may be generated. Further, "I want to search for Red of Leslie Cheung" may be split into multiple segmentation characters: "I", "want to search for", "Red", "of", and "Leslie Cheung". Because "I" corresponds to the character variable "song", "want to search for" corresponds to the character variable "%want%", "Leslie Cheung" corresponds to the character variable "%singer%", "of" corresponds to the character variable "%of%", and "Red" corresponds to the character variable "%song%", a corresponding searching character variable sentence pattern "%song%%want%%song%%of%%singer%" may be generated. That is, the historical searching character string "I want to search for Red of Leslie Cheung" corresponds to two searching character variable sentence patterns.

Further, the server may accumulate the quantity of generating times corresponding to the searching character variable sentence pattern not belonging to the preset common searching sentence pattern set in the generated searching character variable sentence pattern. That is, each time a searching character variable sentence pattern is generated for one historical searching character string, 1 is added to the quantity of generating times corresponding to the searching character variable sentence pattern, to accumulate the quantity of generating times. For example, if it is obtained through statistics collection according to the at least one historical searching character string that a quantity of generating times corresponding to a searching character variable sentence pattern is 60, it indicates that the searching character variable sentence pattern can be generated for 60 historical searching character strings in the at least one historical searching character string. For another example, if the at least one historical searching character string includes "want to search for Red of Leslie Cheung", "want to search for Wang qing shui of Andy Lau", "want to search for Wen bie", and "want to search for Andy Lau", the historical searching character string "want to search for Red of Leslie Cheung" corresponds to the searching character variable sentence pattern "%want%%song%%of%%singer%", the historical searching character string "want to search for Wang qing shui of Andy Lau" corresponds to the searching character variable sentence pattern "%want%%song%%of%%singer%", the historical searching character string "want to search for Wen bie" corresponds to the searching character variable sentence pattern "%want%%song%", and the historical searching character string "want to search for Andy Lau" corresponds to the searching character variable sentence pattern "%want%%singer%", 2 may be added to a quantity of generating times corresponding to the searching character variable sentence pattern "%want%%song%%of%%singer%", 1 may be added to a quantity of generating times corresponding to the searching character variable sentence pattern "%want%%song%", and 1 may be added to a quantity of generating times corresponding to the searching character variable sentence pattern "%want%%singer%".

Further, the server may further add a searching character variable sentence pattern whose quantity of generating times reaches a first preset threshold of a quantity of times to the common searching sentence pattern set. For example, if the first preset threshold of a quantity of times is 1000, when an accumulated quantity of generating times corresponding to a searching character variable sentence pattern is 1000, the searching character variable sentence pattern may be added to the common searching sentence pattern set, and the quantity of generating times corresponding to the searching character variable sentence pattern does not need to be accumulated subsequently. Further, a specific process of adding, by the server, the searching character variable sentence pattern whose quantity of generating times reaches the first preset threshold of a quantity of times to the common searching sentence pattern set may be: sending, by the server, a message to an administrator client when detecting that a quantity of generating times corresponding to a searching character variable sentence pattern reaches the first threshold of a quantity of times, so that the administrator determines whether to add the searching character variable sentence pattern to the common searching sentence pattern set, and the administrator may further determine whether to add a searching character variable sentence pattern associated with the searching character variable sentence pattern to a trash searching sentence pattern set. A searching character variable sentence pattern in the trash searching sentence pattern set is a sentence pattern that is no longer used. That is, quantities of times corresponding to the searching character variable sentence pattern in the common searching sentence pattern set and the searching character variable sentence pattern in the trash searching sentence pattern set do not need to be accumulated. For example, the historical searching character string "I want to search for Red of Leslie Cheung" may correspond to two searching character variable sentence patterns: "%want%%song%%of%%singer%" and "%song%%want%%song%%of%%singer%". When a quantity of generating times corresponding to the searching character variable sentence pattern "%want%%song%%of%%singer%" reaches the first preset threshold of a quantity of times, the administrator may instruct, by using the administrator client, the server to add the searching character variable sentence pattern "%want%%song%%of%%singer%" to the common searching sentence pattern set, and instruct the server to add the searching character variable sentence pattern "%song%%want%%song%%of%%singer%" to the trash searching sentence pattern set.

S103. Determine, when a current searching character string sent by a client is obtained, a searching character variable sentence pattern belonging to the common searching sentence pattern set in at least one searching character variable sentence pattern corresponding to the current searching character string as a target searching character variable sentence pattern, and send searching result data corresponding to the target searching character variable sentence pattern to the client.

Specifically, when the server obtains the current searching character string sent by the client, the server may determine the searching character variable sentence pattern belonging to the common searching sentence pattern set in the at least one searching character variable sentence pattern corresponding to the current searching character string as the target searching character variable sentence pattern, and send the searching result data corresponding to the target searching character variable sentence pattern to the client. Because the target searching character variable sentence pattern is a sentence pattern that most satisfies intention of a user, accuracy of recognizing the current searching character string can be improved, to ensure that a searching result can satisfy expectations of the user. For example, if the current searching character string sent by the client is "I want to search for Red of Leslie Cheung", the server generates searching character variable sentence patterns "%want%%song%%of%%singer%" and "%song%%want%%song%%of%%singer%" corresponding to "I want to search for Red of Leslie Cheung". Because "%want%%song%%of%%singer%" belongs to the common searching sentence pattern set, the server directly sends searching result data corresponding to "%want%%song%%of%%singer%" to the client. The searching result data corresponding to "%want%%song%%of%%singer%" includes the song "Red" of Leslie Cheung. As can be seen, the searching result data corresponding to "%want%%song%%of%%singer%" satisfies the expectations of the user. Searching result data corresponding to "%song%%want%%song%%of%%singer%" includes two songs "I" and "Red" of Leslie Cheung. As can be seen, the searching result data corresponding to "%song%%want%%song%%of%%singer%" does not fully satisfy the expectations of the user. Because the searching character variable sentence pattern "%want%%song%%of%%singer%" better satisfies the expectations of the user than the searching character variable sentence pattern "%song%%want%%song%%of%%singer%", a probability of generating the searching character variable sentence pattern "%want%%song%%of%%singer%" from a large quantity of historical searching character strings is higher than a probability of generating the searching character variable sentence pattern "%song%%want%%song%%of%%singer%". That is, the searching character variable sentence pattern "%want%%song%%of%%singer%" gains a higher priority of being added to the common searching sentence pattern set.

Because S101 and S102 may be performed every the first time interval, the searching character variable sentence pattern in the common searching sentence pattern set may be updated constantly, and the searching result data obtained when S103 is performed is more accurate. That is, the searching result data better satisfies the expectations of the user.

In this embodiment of this application, when a first preset time interval arrives, at least one historical searching character string collected within the first time interval is obtained, so that at least one searching character variable sentence pattern corresponding to each of the at least one historical searching character string can be generated according to a preset searching character variable set, a quantity of generating times corresponding to a searching character variable sentence pattern not belonging to a preset common searching sentence pattern set in the generated searching character variable sentence pattern can be accumulated, and a searching character variable sentence pattern whose quantity of generating times reaches a first preset threshold of a quantity of times can be added to the common searching sentence pattern set, to ensure that a searching character variable sentence pattern in the common searching sentence pattern set is a commonly used sentence pattern. That is, it indicates that the searching character variable sentence pattern in the common searching sentence pattern set is a sentence pattern better satisfying intention of a user. Therefore, when a current searching character string sent by a client is obtained, a searching character variable sentence pattern belonging to the common searching sentence pattern set in at least one searching character variable sentence pattern corresponding to the current searching character string can be determined as a target searching character variable sentence pattern, and searching result data corresponding to the target searching character variable sentence pattern can be sent to the client. Because the target searching character variable sentence pattern is a sentence pattern most satisfying the intention of the user, accuracy of recognizing a current searching character string can be improved, to ensure that a searching result can satisfy expectations of the user.

Figure 2:
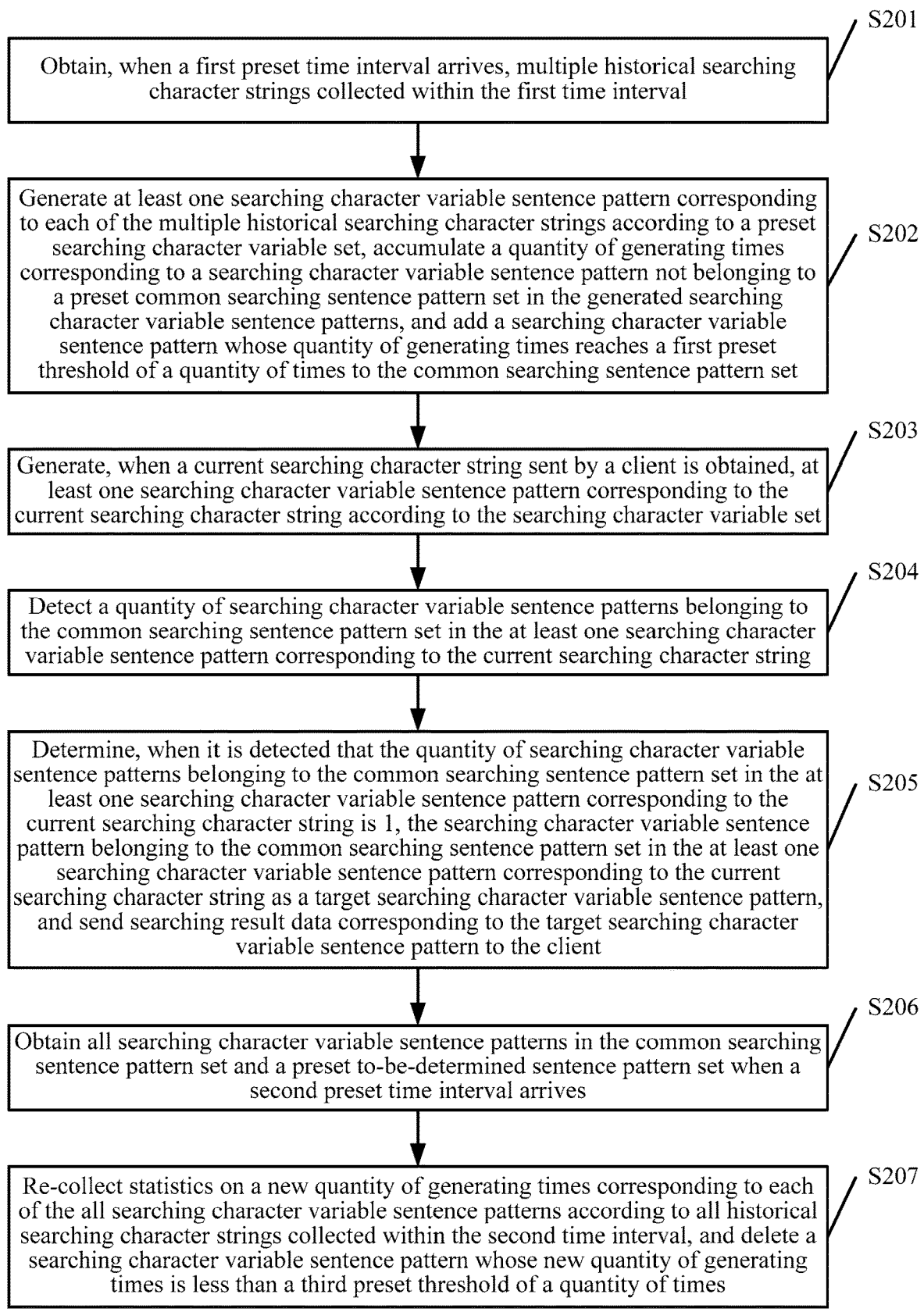
FIG. 2 is a schematic flowchart of another searching processing method according to an embodiment of this application.

Referring to FIG. 2, FIG. 2 is a schematic flowchart of another searching processing method according to an embodiment of this application. The method may include the following steps.

S201. Obtain, when a first preset time interval arrives, at least one historical searching character string collected within the first time interval.

S202. Generate at least one searching character variable sentence pattern corresponding to each of the at least one historical searching character string according to a preset searching character variable set, accumulate a quantity of generating times corresponding to a searching character variable sentence pattern not belonging to a preset common searching sentence pattern set in the generated searching character variable sentence pattern, and add a searching character variable sentence pattern whose quantity of generating times reaches a first preset threshold of a quantity of times to the common searching sentence pattern set.

For specific implementations of steps S201 and S202, refer to S101 and S102 in the embodiment corresponding to FIG. 1, and details are not described herein again.

S203. Generate, when a current searching character string sent by a client is obtained, at least one searching character variable sentence pattern corresponding to the current searching character string according to the searching character variable set.

Specifically, when the current searching character string sent by the client is obtained, the at least one searching character variable sentence pattern corresponding to the current searching character string is generated according to the searching character variable set. A specific process of generating the searching character variable sentence pattern is the same as S102 in the embodiment corresponding to FIG. 1. For example, character variables included in the searching character variable set are separately "%singer%", "%song%", "%want%", "%of%", "%prefix%", and "%suffix%". Searching characters included in the character variable "%singer%" may be names of all singers in a background music library. Searching characters included in the character variable "%song%" may be names of all songs in the background music library. Searching characters included in the character variable "%want%" may be separately phrases such as "I want to search for", and "want to search for". Searching characters included in the character variable "%of%" may be separately "of", "and", and the like. Searching characters included in the character variable "%prefix%" may be separately "hello", "could you please", and the like. Searching characters included in the character variable "%suffix%" may be separately "thanks", "thank you very much", and the like. If the current searching character string is "I want to search for Red of Leslie Cheung", the corresponding searching character variable sentence pattern "%want%%song%%of%%singer%" may be generated. Because "I" in the current searching character string is also a name of a song of Leslie Cheung, the corresponding searching character variable sentence pattern "%song%%want%%song%%of%%singer%" may also be generated.

S204. Detect a quantity of searching character variable sentence patterns belonging to the common searching sentence pattern set in the at least one searching character variable sentence pattern corresponding to the current searching character string.

Specifically, the server may further detect the quantity of the searching character variable sentence patterns belonging to the common searching sentence pattern set in the at least one searching character variable sentence pattern corresponding to the current searching character string. For example, the current searching character string "I want to search for Red of Leslie Cheung" corresponds to two searching character variable sentence patterns, namely, "%want%%song%%of%%singer%" and "%song%%want%%song%%of%%singer%". Only the searching character variable sentence pattern "%want%%song%%of%%singer%" belongs to the common searching sentence pattern set. Therefore, it may be detected that a quantity of searching character variable sentence patterns belonging to the common searching sentence pattern set exists in the two searching character variable sentence patterns corresponding to the current searching character string "I want to search for Red of Leslie Cheung" is 1.

S205. Determine, when it is detected that the quantity of searching character variable sentence patterns belonging to the common searching sentence pattern set in the at least one searching character variable sentence pattern corresponding to the current searching character string is 1, the searching character variable sentence pattern belonging to the common searching sentence pattern set in the at least one searching character variable sentence pattern corresponding to the current searching character string as a target searching character variable sentence pattern, and send searching result data corresponding to the target searching character variable sentence pattern to the client.

Specifically, when detecting that the quantity of the searching character variable sentence patterns belonging to the common searching sentence pattern set in the at least one searching character variable sentence pattern corresponding to the current searching character string is 1, the server may determine the searching character variable sentence pattern belonging to the common searching sentence pattern set in the at least one searching character variable sentence pattern corresponding to the current searching character string as the target searching character variable sentence pattern, and send the searching result data corresponding to the target searching character variable sentence pattern to the client. Because the target searching character variable sentence pattern is a sentence pattern that most satisfies intention of a user, accuracy of recognizing the current searching character string can be improved, to ensure that a searching result can satisfy the expectations of the user. For example, if the current searching character string sent by the client is "I want to search for Red of Leslie Cheung", the server generates searching character variable sentence patterns "%want%%song%%of%%singer%" and "%song%%want%%song%%of%%singer%" corresponding to "I want to search for Red of Leslie Cheung". Because "%want%%song%%of%%singer%" belongs to the common searching sentence pattern set, the server directly sends searching result data corresponding to "%want%%song%%of%%singer%" to the client. The searching result data corresponding to "%want%%song%%of%%singer%" includes the song "Red" of Leslie Cheung. As can be seen, the searching result data corresponding to "%want%%song%%of%%singer%" satisfies the expectations of the user. Searching result data corresponding to "%song%%want%%song%%of%%singer%" includes two songs "I" and "Red" of Leslie Cheung. As can be seen, the searching result data corresponding to "%song%%want%%song%%of%%singer%" does not fully satisfy the expectations of the user. Because the searching character variable sentence pattern "%want%%song%%of%%singer%" better satisfies the expectations of the user than the searching character variable sentence pattern "%song%%want%%song%%of%%singer%", a probability of generating the searching character variable sentence pattern "%want%%song%%of%%singer%" from a large quantity of historical searching character strings is higher than a probability of generating the searching character variable sentence pattern "%song%%want%%song%%of%%singer%". That is, the searching character variable sentence pattern "%want%%song%%of%%singer%" gains a higher priority of being added to the common searching sentence pattern set.

Optionally, when it is detected that the quantity of searching character variable sentence patterns belonging to the common searching sentence pattern set in the at least one searching character variable sentence pattern corresponding to the current searching character string is 0, a searching character variable sentence pattern having a largest quantity of generating times in the at least one searching character variable sentence pattern corresponding to the current searching character string is determined as the target searching character variable sentence pattern, and the searching result data corresponding to the target searching character variable sentence pattern is sent to the client.

Optionally, when it is detected that the quantity of searching character variable sentence patterns belonging to the common searching sentence pattern set in the at least one searching character variable sentence pattern corresponding to the current searching character string is greater than 1, popularity rank information corresponding to each of the multiple searching character variable sentence patterns belonging to the common searching sentence pattern set in the at least one searching character variable sentence pattern corresponding to the current searching character string is obtained, a searching character variable sentence pattern having a highest popularity rank is determined as the target searching character variable sentence pattern, and the searching result data corresponding to the target searching character variable sentence pattern is sent to the client. For example, the current searching character string is "I want to search for ABC". "ABC" is both a name of a singer and a name of a song. Therefore, searching character variable sentence patterns corresponding to the current searching character string "I want to search for ABC" may be separately "%want%%singer%" and "%want%%song%". If both searching character variable sentence patterns "%want%%singer%" and "%want%%song%" belong to the common searching sentence pattern set, a user click volume (that is, popularity ranking information) of "ABC" as a singer may be obtained, a user click volume of "ABC" as a song may be obtained, and the two user click volumes are further compared. If the user click volume of "ABC" as the song has a larger user click volume, searching result data corresponding to "%want%%song%" (that is, a song whose name is "ABC" is used as searching result data) is sent to the client.

S206. Obtain all searching character variable sentence patterns in the common searching sentence pattern set and a preset to-be-determined sentence pattern set when a second preset time interval arrives.

Specifically, when the second preset time interval arrives, the server may obtain all the searching character variable sentence patterns in the common searching sentence pattern set and the preset to-be-determined sentence pattern set. The to-be-determined sentence pattern set is used to store a searching character variable sentence pattern that is not added to the common searching sentence pattern set. That is, when the at least one searching character variable sentence pattern corresponding to the historical searching character string is generated in S202, a searching character variable sentence pattern that does not belong to the common searching sentence pattern set and that is not in the to-be-determined sentence pattern set may be added to the to-be-determined sentence pattern set, and a quantity of generating times corresponding to the searching character variable sentence pattern is set to 1. Then, 1 is added to the quantity of generating times each time the searching character variable sentence pattern is generated, and the searching character variable sentence pattern is transferred from the to-be-determined sentence pattern set to the common searching sentence pattern set when the quantity of generating times corresponding to the searching character variable sentence pattern reaches the first threshold of a quantity of times.

S207. Re-collect statistics on a new quantity of generating times corresponding to each of the all searching character variable sentence patterns according to all historical searching character strings collected within the second time interval, and delete a searching character variable sentence pattern whose new quantity of generating times is less than a third preset threshold of a quantity of times.

Specifically, the server may re-collect statistics on the new quantity of generating times corresponding to each of the all searching character variable sentence patterns according to searching character variable sentence patterns corresponding to all the historical searching character strings collected within the second time interval, and delete the searching character variable sentence pattern whose new quantity of generating times is less than the third preset threshold of a quantity of times, to ensure that quantities of searching character variable sentence patterns in the to-be-determined sentence pattern set and the common searching sentence pattern set do not grow constantly, and avoid a case of too many resources on the engine. For example, if the second time interval is one month, the server deletes, once a month, a searching character variable sentence pattern that is not commonly used in the month. Using a month as an example, all current searching character variable sentence patterns obtained by the server in the common searching sentence pattern set and the to-be-determined sentence pattern set include A, B, C, D, E, and F, and all historical searching character strings in the month are obtained. If A is generated once, C is generated for ten times, E is generated for five times, and F is generated for eight times in all the historical searching character strings in the month, a new quantity of generating times corresponding to A is 1, a new quantity of generating times corresponding to B is 0, a new quantity of generating times corresponding to C is 10, a new quantity of generating times corresponding to D is 0, a new quantity of generating times corresponding to E is 5, and a new quantity of generating times corresponding to F is 8. If the third preset threshold of a quantity of times is 2, the searching character variable sentence patterns A, B, and D are deleted.

In this embodiment of this application, when a first preset time interval arrives, at least one historical searching character string collected within the first time interval is obtained, so that at least one searching character variable sentence pattern corresponding to each of the at least one historical searching character string can be generated according to a preset searching character variable set, a quantity of generating times corresponding to a searching character variable sentence pattern not belonging to a preset common searching sentence pattern set in the generated searching character variable sentence pattern can be accumulated, and a searching character variable sentence pattern whose quantity of generating times reaches a first preset threshold of a quantity of times can be added to the common searching sentence pattern set, to ensure that a searching character variable sentence pattern in the common searching sentence pattern set is a commonly used sentence pattern. That is, it indicates that the searching character variable sentence pattern in the common searching sentence pattern set is a sentence pattern better satisfying intention of a user. Therefore, when a current searching character string sent by a client is obtained, a searching character variable sentence pattern belonging to the common searching sentence pattern set in at least one searching character variable sentence pattern corresponding to the current searching character string can be determined as a target searching character variable sentence pattern, and searching result data corresponding to the target searching character variable sentence pattern can be sent to the client. Because the target searching character variable sentence pattern is a sentence pattern most satisfying the intention of the user, accuracy of recognizing a current searching character string can be improved, to ensure that a searching result can satisfy expectations of the user.

Figure 3:
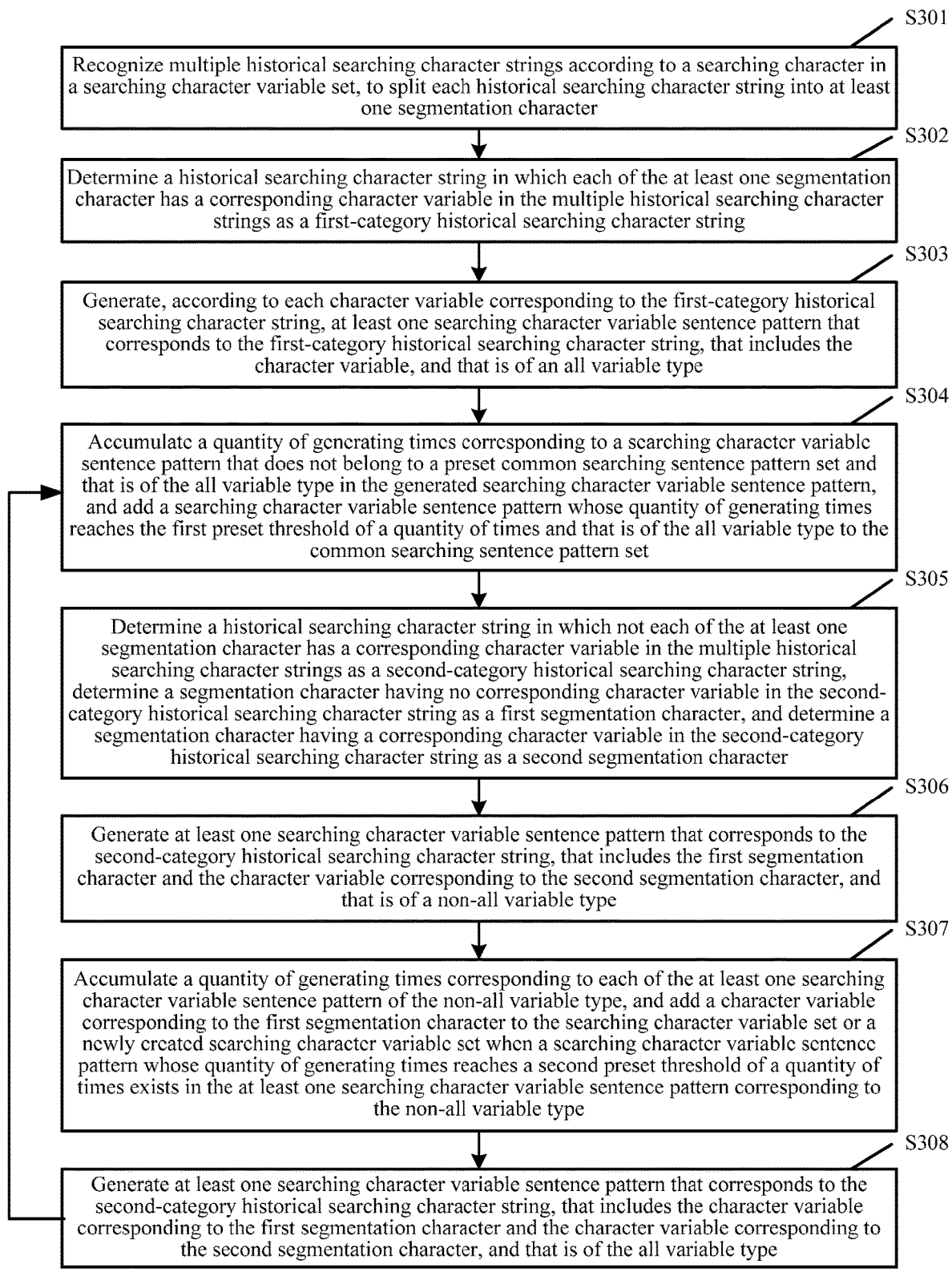
FIG. 3 is a schematic flowchart of a sentence pattern processing method according to an embodiment of this application.

Referring to FIG. 3, FIG. 3 is a schematic flowchart of a sentence pattern processing method according to an embodiment of this application. The method in this embodiment of this application may correspond to S102 in the embodiment corresponding to FIG. 1 or S202 in the embodiment corresponding to FIG. 2. The method specifically includes the following steps.

S301. Recognize the at least one historical searching character string according to the searching character in the searching character variable set, to split each historical searching character string into at least one segmentation character.

Specifically, the searching character variable set may include at least one character variable, and each character variable includes a searching character associated with the character variable. For example, character variables included in the searching character variable set are separately "%singer%", "%song%", "%want%", "%of%", "%prefix%", and "%suffix%". Searching characters included in the character variable "%singer%" may be names of all singers in a background music library. Searching characters included in the character variable "%song%" may be names of all songs in the background music library. Searching characters included in the character variable "%want%" may be separately phrases such as "I want to search for", and "want to search for", and meanings of the searching characters are similar to that of the character variable "%want%". Searching characters included in the character variable "%of%" may be separately "of", "and", and the like, and meanings of the searching characters are similar to that of the character variable "%of%". Searching characters included in the character variable "%prefix%" may be separately "hello", "could you please", and the like, and meanings of the searching characters are similar to that of the character variable "%prefix%". Searching characters included in the character variable "%suffix%" may be separately "thanks", "thank you very much", and the like, and meanings of the searching characters are similar to that of the character variable "%suffix%". Therefore, the server may recognize the at least one historical searching character string according to a searching character included in each character variable in the searching character variable set, to split each historical searching character string into at least one segmentation character. For example, if the historical character string is "want to search for Red of Leslie Cheung", "want to search for Red of Leslie Cheung" may be split into multiple segmentation characters: "want to search for", "Red", "of", and "Leslie Cheung" according to the searching character variable set.

S302. Determine a historical searching character string in which each of the at least one segmentation character has a corresponding character variable in the at least one historical searching character string as a first-category historical searching character string.

Specifically, after splitting each historical searching character string into at least one segmentation character, the server may detect whether each segmentation character corresponding to each historical searching character string has a corresponding character variable, and determine the historical searching character string in which each of the at least one segmentation character has a corresponding character variable in the at least one historical searching character string as the first-category historical searching character string. For example, multiple segmentation characters corresponding to the historical searching character string "want to search for Red of Leslie Cheung" are separately "want to search for", "Red", "of", and "Leslie Cheung". Because "want to search for" corresponds to the character variable "%want%", "Leslie Cheung" corresponds to the character variable "%singer%", "of" corresponds to the character variable "%of%", and "Red" corresponds to the character variable "%song%", it indicates that each segmentation character has a corresponding character variable, and the historical searching character string "want to search for Red of Leslie Cheung" can be determined as the first-category historical searching character string.

S303. Generate, according to each character variable corresponding to the first-category historical searching character string, at least one searching character variable sentence pattern that corresponds to the first-category historical searching character string, that includes the character variable, and that is of an all variable type.

Specifically, if there are multiple first-category historical searching character strings, at least one searching character variable sentence pattern that corresponds to each first-category historical searching character string, that exclusively includes character variables, and that is of the all variable type may be generated according to each character variable corresponding to each first-category historical searching character string. Using a first-category historical searching character string "want to search for Red of Leslie Cheung" as an example, character variables corresponding to "want to search for Red of Leslie Cheung" are separately "%want%", "%song%", "%of%", and "%singer%". Then, a searching character variable sentence pattern "%want%%song%%of%%singer%" that includes the corresponding character variables and that is of the all variable type may be generated. The searching character variable sentence pattern of the all variable type is a searching character variable sentence pattern exclusively including the character variables.

S304. Accumulate a quantity of generating times corresponding to a searching character variable sentence pattern that does not belong to the preset common searching sentence pattern set and that is of the all variable type in the generated searching character variable sentence pattern, and add a searching character variable sentence pattern whose quantity of generating times reaches the first preset threshold of a quantity of times and that is of the all variable type to the common searching sentence pattern set.

Specifically, the server may accumulate the quantity of generating times corresponding to the searching character variable sentence pattern that does not belong to the preset common searching sentence pattern set and that is of the all variable type in the generated searching character variable sentence pattern. That is, each time a searching character variable sentence pattern of the all variable type is generated for one historical searching character string, 1 is added to a quantity of generating times corresponding to the searching character variable sentence pattern of the all variable type, to accumulate the quantity of generating times. For example, if it is obtained through statistics collection according to the at least one historical searching character string that a quantity of generating times corresponding to a searching character variable sentence pattern of the all variable type is 60, it indicates that the searching character variable sentence pattern of the all variable type may be generated for 60 historical searching character strings in the at least one historical searching character string. For another example, if the at least one historical searching character string includes "want to search for Red of Leslie Cheung", "want to search for Wang qing shui of Andy Lau", "want to search for Wen bie", and "want to search for Andy Lau", the historical searching character string "want to search for Red of Leslie Cheung" corresponds to the searching character variable sentence pattern "%want%%song%%of%%singer%" of the all variable type, the historical searching character string "want to search for Wang qing shui of Andy Lau" corresponds to the searching character variable sentence pattern "%want%%song%%of%%singer%" of the all variable type, the historical searching character string "want to search for Wen bie" corresponds to the searching character variable sentence pattern "%want%%song%" of the all variable type, and the historical searching character string "want to search for Andy Lau" corresponds to the searching character variable sentence pattern "%want%%singer%" of the all variable type, 2 may be added to a quantity of generating times corresponding to the searching character variable sentence pattern "%want%%song%%of%%singer%" of the all variable type, 1 may be added to a quantity of generating times corresponding to the searching character variable sentence pattern "%want%%song%" of the all variable type, and 1 may be added to a quantity of generating times corresponding to the searching character variable sentence pattern "%want%%singer%" of the all variable type.

Further, the server may further add a searching character variable sentence pattern whose quantity of generating times reaches the first preset threshold of a quantity of times and that is of the all variable type to the common searching sentence pattern set. For example, if the first preset threshold of a quantity of times is 1000, when an accumulated quantity of generating times corresponding to a searching character variable sentence pattern of the all variable type is 1000, the searching character variable sentence pattern of the all variable type may be added to the common searching sentence pattern set, and the quantity of generating times corresponding to the searching character variable sentence pattern of the all variable type does not need to be accumulated subsequently. Further, a specific process of adding, by the server, the searching character variable sentence pattern whose quantity of generating times reaches the first preset threshold of a quantity of times and that is of the all variable type to the common searching sentence pattern set may be: sending, by the server, a message to an administrator client when detecting that a quantity of generating times corresponding to a searching character variable sentence pattern of the all variable type reaches the first threshold of a quantity of times, so that the administrator determines whether to add the searching character variable sentence pattern of the all variable type to the common searching sentence pattern set, and the administrator may further determine whether to add a searching character variable sentence pattern associated with the searching character variable sentence pattern of the all variable type to a trash searching sentence pattern set. A searching character variable sentence pattern in the trash searching sentence pattern set is a sentence pattern that is no longer used. That is, quantities of generating times corresponding to the searching character variable sentence pattern in the common searching sentence pattern set and the searching character variable sentence pattern in the trash searching sentence pattern set do not need to be accumulated. For example, the historical searching character string "I want to search for Red of Leslie Cheung" may correspond to two searching character variable sentence patterns of the all variable type: "%want%%song%%of%%singer%" and "%song%%want%%song%%of%%singer%". When a quantity of generating times corresponding to the searching character variable sentence pattern "%want%%song%%of%%singer%" reaches the first preset threshold of a quantity of times, the administrator may instruct, by using the administrator client, the server to add the searching character variable sentence pattern "%want%%song%%of%%singer%" to the common searching sentence pattern set, and instruct the server to add the searching character variable sentence pattern "%song%%want%%song%%of%%singer%" to the trash searching sentence pattern set.

S305. Determine a historical searching character string in which not each of the at least one segmentation character has a corresponding character variable in the at least one historical searching character string as a second-category historical searching character string, determine a segmentation character having no corresponding character variable in the second-category historical searching character string as a first segmentation character, and determine a segmentation character having a corresponding character variable in the second-category historical searching character string as a second segmentation character.

Specifically, after statistics has been collected on the searching character variable sentence pattern of the all variable type, the server may further determine the historical searching character string in which not each of the at least one segmentation character has a corresponding character variable in the at least one historical searching character string as the second-category historical searching character string, determine the segmentation character having no corresponding character variable in the second-category historical searching character string as the first segmentation character, and determine the segmentation character having the corresponding character variable in the second-category historical searching character string as the second segmentation character. For example, the historical searching character string is "want to search for Red of Leslie Cheung". Because the segmentation character "want to search for" does not belong to any character variable in the searching character variable set, "Leslie Cheung" corresponds to the character variable %singer%, "of" corresponds to the character variable %of%, and "Red" corresponds to the character variable %song%, the historical searching character string "want to search for Red of Leslie Cheung" may be determined as the second-category historical searching character string, the segmentation character "want to search for" may be determined as the first segmentation character, and the segmentation characters "Red", "of", and "Leslie Cheung" may be determined as the second segmentation character.

S306. Generate at least one searching character variable sentence pattern that corresponds to the second-category historical searching character string, that includes the first segmentation character and the character variable corresponding to the second segmentation character, and that is of a non-all variable type.

Specifically, if there are multiple second-category historical searching character strings, at least one searching character variable sentence pattern that corresponds to each second-category historical searching character string, that includes a first segmentation character and a character variable corresponding to a second segmentation character, and that is of the non-all variable type may be generated. Using a second-category historical searching character string "want to search for Red of Leslie Cheung" as an example, the first segmentation character includes "want to search for", the second segmentation character includes "Red", "of", and "Leslie Cheung", "Leslie Cheung" corresponds to the character variable %singer%, "of" corresponds to the character variable %of%, and "Red" corresponds to the character variable %song%. Therefore, a searching character variable sentence pattern "want to search for %song%%of%%singer%" that corresponds to "want to search for Red of Leslie Cheung", that includes the first segmentation character and the character variable corresponding to the second segmentation character, and that is of the non-all variable type may be generated. The searching character variable sentence pattern of the non-all variable type is a searching character variable sentence pattern non-exclusively including the character variable.

S307. Accumulate a quantity of generating times corresponding to each of the at least one searching character variable sentence pattern of the non-all variable type, and add a character variable corresponding to the first segmentation character to the searching character variable set or a newly created searching character variable set when a searching character variable sentence pattern whose quantity of generating times reaches a second preset threshold of a quantity of times exists in the at least one searching character variable sentence pattern corresponding to the non-all variable type.

Specifically, when a searching character variable sentence pattern of the non-all variable type is generated for one second-category historical searching character string, 1 is added to a quantity of generating times corresponding to the searching character variable sentence pattern of the non-all variable type, that is, the quantity of generating times is accumulated. When the quantity of generating times corresponding to the searching character variable sentence pattern of the non-all variable type reaches the second threshold of a quantity of times, the character variable corresponding to the first segmentation character may be added to the searching character variable set or the newly created searching character variable set. For example, if the second-category historical searching character string "want to search for Red of Leslie Cheung" corresponds to the searching character variable sentence pattern "want to search for %song%%of%%singer%" of the non-all variable type, and the second threshold of a quantity of times is 500, when a quantity of generating times corresponding to "want to search for %song%%of%%singer%" reaches 500, it indicates that "want to search for %song%%of%%singer%" may be generated for 500 second-category historical searching character strings. In this case, the first segmentation character "want to search for" may be added to the existing character variable "want" manually, or a new character variable %want to search for% is created manually, and the first segmentation character "want to search for" is added to the new character variable "want to search for".

S308. Generate at least one searching character variable sentence pattern that corresponds to the second-category historical searching character string, that includes the character variable corresponding to the first segmentation character and the character variable corresponding to the second segmentation character, and that is of the all variable type.

Specifically, after the first segmentation character has the corresponding character variable, at least one searching character variable sentence pattern that corresponds to the second-category historical searching character string including the first segmentation character, that includes the character variable corresponding to the first segmentation character and the character variable corresponding to the second segmentation characters, and that is of the all variable type may be generated, and S304 of accumulating a quantity of generating times corresponding to a searching character variable sentence pattern that does not belong to the preset common searching sentence pattern set and that is of the all variable type in the generated searching character variable sentence pattern, and adding a searching character variable sentence pattern whose quantity of generating times reaches the first preset threshold of a quantity of times and that is of the all variable type to the common searching sentence pattern set is re-performed. For example, if the first segmentation character "want to search for" corresponds to the character variable %want%, the searching character variable sentence pattern "%want%%song%%of%%singer%" that is of the all variable type and that corresponds to the second-category historical searching character string "want to search for Red of Leslie Cheung" may be generated, and 1 may be added to a quantity of generating times corresponding to the existing "%want%%song%%of%%singer%" (if it is obtained through statistics collection in S304 that the quantity of generating times corresponding to "%want%%song%%of%%singer%" is 560, in this case, the quantity of generating times may be accumulated to 561), or the searching character variable sentence pattern "%want%%singer%" that is of the all variable type and that corresponds to the second-category historical searching character string "want to search for Red of Leslie Cheung" may be generated, and 1 is still added to a quantity of generating times corresponding to the existing "%want%%singer%".

In this embodiment of this application, at least one searching character variable sentence pattern corresponding to each of at least one historical searching character string is generated according to a preset searching character variable set, and a quantity of generating times corresponding to a searching character variable sentence pattern not belonging to a preset common searching sentence pattern set in the generated searching character variable sentence pattern is accumulated, so that a searching character variable sentence pattern whose quantity of generating times reaches a first preset threshold of a quantity of times is added to the common searching sentence pattern set, to ensure that a searching character variable sentence pattern in the common searching sentence pattern set is a commonly used sentence pattern. That is, it indicates that the searching character variable sentence pattern in the common searching sentence pattern set is a sentence pattern better satisfying intention of a user. In addition, when a searching character variable sentence pattern is generated, the searching character variable sentence pattern may be classified into an all variable type and a non-all variable type, and separate statistics collection is performed on a searching character variable sentence pattern of the non-all variable type, to allocate a character variable to a segmentation character having no corresponding character variable or create a new character variable for a segmentation character having no corresponding character variable, so as to ensure that more words can be recognized according to the searching character variable set, and further improve accuracy of recognizing a searching character string entered by the user.

Figure 4:
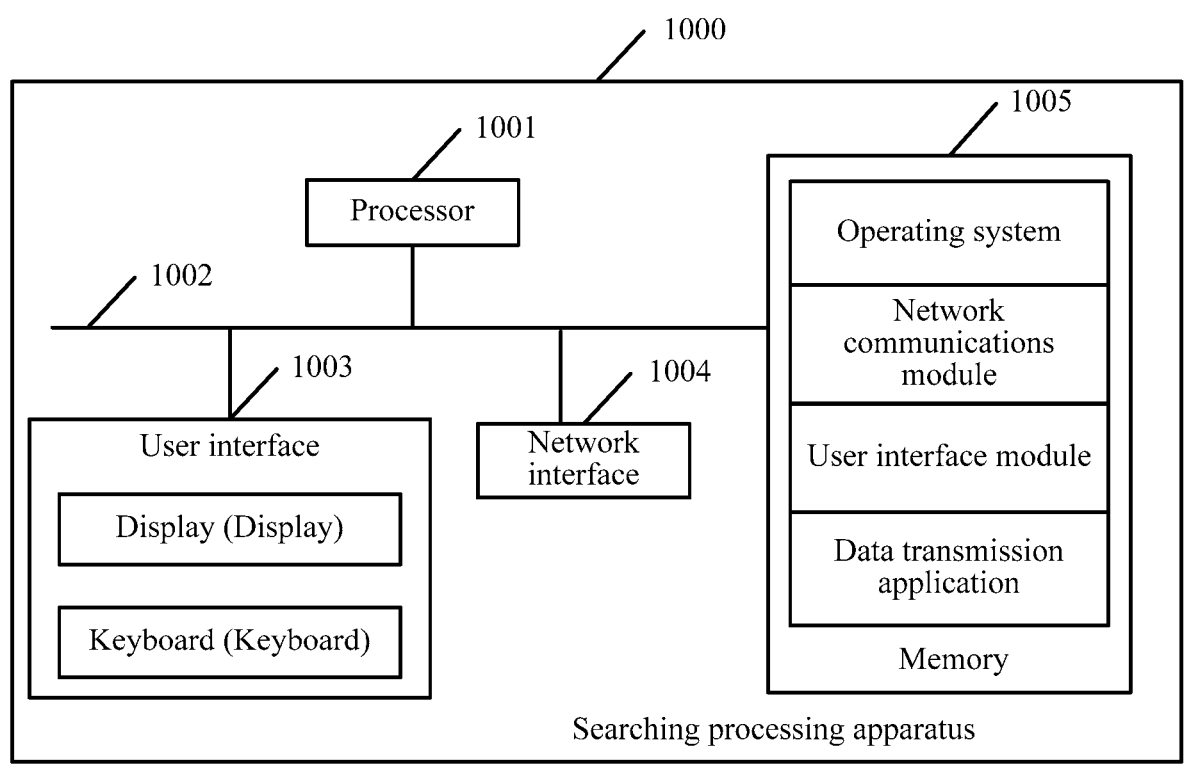
FIG. 4 is a schematic structural diagram of still another searching processing apparatus according to an embodiment of this application.

Referring to FIG. 4, FIG. 4 is a schematic structural diagram of a searching processing apparatus according to an embodiment of this application. As shown in FIG. 4, the searching processing apparatus 1000 may include at least one processor 1001, for example, a CPU, at least one network interface 1004, a user interface 1003, a memory 1005, and at least one communications bus 1002. The communications bus 1002 is configured to implement connection and communication between the components. The user interface 1003 may include a display, and a keyboard. Optionally, the user interface 1003 may further include a standard wired interface and a wireless interface. The network interface 1004 may, optionally, include a standard wired interface and a wireless interface (for example, a Wi-Fi interface). The memory 1005 may be a high-speed random access memory (RAM), or may be a non-volatile memory, for example, at least one magnetic disk memory. Optionally, the memory 1005 may also be at least one storage device located away from the processor 1001. As shown in FIG. 4, as a computer storage medium, the memory 1005 may include an operating system, a network communications module, a user interface module, and a device control application.

In the searching processing apparatus 1000 shown in FIG. 4, the network interface 1004 is mainly configured to connect to a client, and perform data communication with the client. The user interface 1003 is mainly configured to provide an interface for inputting by a user, and obtain data output by the user. The processor 1001 may be configured to invoke the device control application stored in the memory 1005, and specifically perform the following steps:

obtaining, when a first preset time interval arrives, at least one historical searching character string collected within the first time interval;

generating at least one searching character variable sentence pattern corresponding to each of the at least one historical searching character string according to a preset searching character variable set, accumulating a quantity of generating times corresponding to a searching character variable sentence pattern not belonging to a preset common searching sentence pattern set in the generated searching character variable sentence pattern, and adding a searching character variable sentence pattern whose quantity of generating times reaches a first preset threshold of a quantity of times to the common searching sentence pattern set; and determining, when a current searching character string sent by a client is obtained, a searching character variable sentence pattern belonging to the common searching sentence pattern set in at least one searching character variable sentence pattern corresponding to the current searching character string as a target searching character variable sentence pattern, and sending searching result data corresponding to the target searching character variable sentence pattern to the client.

In an embodiment, the searching character variable set includes at least one character variable, and each character variable includes a searching character associated with the character variable.

When generating the at least one searching character variable sentence pattern corresponding to each of the at least one historical searching character string according to the preset searching character variable set, accumulating the quantity of generating times corresponding to the searching character variable sentence pattern not belonging to the preset common searching sentence pattern set in the generated searching character variable sentence pattern, and adding the searching character variable sentence pattern whose quantity of generating times reaches the first preset threshold of a quantity of times to the common searching sentence pattern set, the processor 1001 specifically performs the following steps:

recognizing the at least one historical searching character string according to the searching character in the searching character variable set, to split each historical searching character string into at least one segmentation character;

determining a historical searching character string in which each of the at least one segmentation character has a corresponding character variable in the at least one historical searching character string as a first-category historical searching character string;

generating, according to each character variable corresponding to the first-category historical searching character string, at least one searching character variable sentence pattern that corresponds to the first-category historical searching character string, that includes the character variable, and that is of an all variable type; and accumulating a quantity of generating times corresponding to a searching character variable sentence pattern that does not belong to the preset common searching sentence pattern set and that is of the all variable type in the generated searching character variable sentence pattern, and adding a searching character variable sentence pattern whose quantity of generating times reaches the first preset threshold of a quantity of times and that is of the all variable type to the common searching sentence pattern set.

In an embodiment, the processor 1001 further performs the following steps:

determining a historical searching character string in which not each of the at least one segmentation character has a corresponding character variable in the at least one historical searching character string as a second-category historical searching character string, determining a segmentation character having no corresponding character variable in the second-category historical searching character string as a first segmentation character, and determining a segmentation character having a corresponding character variable in the second-category historical searching character string as a second segmentation character;

generating at least one searching character variable sentence pattern that corresponds to the second-category historical searching character string, that includes the first segmentation character and the character variable corresponding to the second segmentation character, and that is of a non-all variable type;

accumulating a quantity of generating times corresponding to each of the at least one searching character variable sentence pattern of the non-all variable type, and adding a character variable corresponding to the first segmentation character to the searching character variable set or a newly created searching character variable set when a searching character variable sentence pattern whose quantity of generating times reaches a second preset threshold of a quantity of times exists in the at least one searching character variable sentence pattern of the non-all variable type; and generating at least one searching character variable sentence pattern that corresponds to the second-category historical searching character string, that includes the character variable corresponding to the first segmentation character and the character variable corresponding to the second segmentation character, and that is of the all variable type, re-accumulating a quantity of generating times corresponding to a searching character variable sentence pattern that does not belong to the preset common searching sentence pattern set and that is of the all variable type in the generated searching character variable sentence pattern, and adding a searching character variable sentence pattern whose quantity of generating times reaches the first preset threshold of a quantity of times and that is of the all variable type to the common searching sentence pattern set.

In an embodiment, when determining, when the current searching character string sent by the client is obtained, the searching character variable sentence pattern belonging to the common searching sentence pattern set in the at least one searching character variable sentence pattern corresponding to the current searching character string as the target searching character variable sentence pattern, and sending the searching result data corresponding to the target searching character variable sentence pattern to the client, the processor 1001 specifically performs the following steps:

generating, when the current searching character string sent by the client is obtained, the at least one searching character variable sentence pattern corresponding to the current searching character string according to the searching character variable set;

detecting a quantity of searching character variable sentence patterns belonging to the common searching sentence pattern set in the at least one searching character variable sentence pattern corresponding to the current searching character string; and determining, when it is detected that the quantity of searching character variable sentence patterns belonging to the common searching sentence pattern set in the at least one searching character variable sentence pattern corresponding to the current searching character string is 1, the searching character variable sentence pattern belonging to the common searching sentence pattern set in the at least one searching character variable sentence pattern corresponding to the current searching character string as the target searching character variable sentence pattern, and sending the searching result data corresponding to the target searching character variable sentence pattern to the client.

In an embodiment, the processor 1001 further performs the following steps:

determining a searching character variable sentence pattern having a largest quantity of generating times in the at least one searching character variable sentence pattern corresponding to the current searching character string as the target searching character variable sentence pattern when it is detected that the quantity of searching character variable sentence patterns belonging to the common searching sentence pattern set in the at least one searching character variable sentence pattern corresponding to the current searching character string is 0, and sending the searching result data corresponding to the target searching character variable sentence pattern to the client; or obtaining, when it is detected that the quantity of searching character variable sentence patterns belonging to the common searching sentence pattern set in the at least one searching character variable sentence pattern corresponding to the current searching character string is greater than 1, popularity rank information corresponding to each of the multiple searching character variable sentence patterns belonging to the common searching sentence pattern set in the at least one searching character variable sentence pattern corresponding to the current searching character string, determining a searching character variable sentence pattern having a highest popularity rank as the target searching character variable sentence pattern, and sending the searching result data corresponding to the target searching character variable sentence pattern to the client.

In an embodiment, the processor 1001 further performs the following steps:

obtaining all searching character variable sentence patterns in the common searching sentence pattern set and a preset to-be-determined sentence pattern set when a second preset time interval arrives, where the to-be-determined sentence pattern set is used to store a searching character variable sentence pattern that is not added to the common searching sentence pattern set; and re-collecting statistics on a new quantity of generating times corresponding to each of the all searching character variable sentence patterns according to all historical searching character strings collected within the second time interval, and deleting a searching character variable sentence pattern whose new quantity of generating times is less than a third preset threshold of a quantity of times.

In this embodiment of this application, when a first preset time interval arrives, at least one historical searching character string collected within the first time interval is obtained, so that at least one searching character variable sentence pattern corresponding to each of the at least one historical searching character string can be generated according to a preset searching character variable set, a quantity of generating times corresponding to a searching character variable sentence pattern not belonging to a preset common searching sentence pattern set in the generated searching character variable sentence pattern can be accumulated, and a searching character variable sentence pattern whose quantity of generating times reaches a first preset threshold of a quantity of times can be added to the common searching sentence pattern set, to ensure that a searching character variable sentence pattern in the common searching sentence pattern set is a commonly used sentence pattern. That is, it indicates that the searching character variable sentence pattern in the common searching sentence pattern set is a sentence pattern better satisfying intention of a user. Therefore, when a current searching character string sent by a client is obtained, a searching character variable sentence pattern belonging to the common searching sentence pattern set in at least one searching character variable sentence pattern corresponding to the current searching character string can be determined as a target searching character variable sentence pattern, and searching result data corresponding to the target searching character variable sentence pattern can be sent to the client. Because the target searching character variable sentence pattern is a sentence pattern most satisfying the intention of the user, accuracy of recognizing a current searching character string can be improved, to ensure that a searching result can satisfy expectations of the user.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely example embodiments of this application, and certainly is not intended to limit the protection scope of this application. Therefore, equivalent variations made in accordance with the claims of this application shall fall within the scope of this application.

What is claimed is:

1. A searching processing method, comprising:
    obtaining, when a first preset time interval arrives, a plurality of historical searching character strings collected within the first time interval;
    generating at least one searching character variable sentence pattern corresponding to each of the plurality of historical searching character strings according to a preset searching character variable set;
    accumulating a quantity of generating times corresponding to a searching character variable sentence pattern not belonging to a preset common searching sentence pattern set in the generated searching character variable sentence pattern;
    adding a searching character variable sentence pattern whose quantity of generating times reaches a first preset threshold of a quantity of times to the preset common searching sentence pattern set;
    obtaining a current searching character string sent by a client; and
    in response to the current searching character string:
        determining a searching character variable sentence pattern belonging to the preset common searching sentence pattern set in at least one searching character variable sentence pattern corresponding to the current searching character string as a target searching character variable sentence pattern,
        performing a search query against a database of search templates for media content, the search query including the target searching character variable sentence pattern, and
        sending searching result data corresponding to the target searching character variable sentence pattern to the client, the search result data including one or more content items matching the target searching character variable sentence pattern.

2. The searching processing method according to claim 1, wherein the searching character variable set comprises at least one character variable, and each character variable comprises a searching character associated with the character variable; and
    the generating at least one searching character variable sentence pattern corresponding to each of the at least one historical searching character string according to a preset searching character variable set, accumulating a quantity of generating times corresponding to a searching character variable sentence pattern not belonging to the preset common searching sentence pattern set in the generated searching character variable sentence pattern, and adding a searching character variable sentence pattern whose quantity of generating times reaches a first preset threshold of a quantity of times to the preset common searching sentence pattern set comprises:
        recognizing the at least one historical searching character string according to the searching character in the searching character variable set, to split each historical searching character string into at least one segmentation character;
        determining a historical searching character string in which each of the at least one segmentation character has a corresponding character variable in the at least one historical searching character string as a first-category historical searching character string;
        generating, according to each character variable corresponding to the first-category historical searching character string, at least one searching character variable sentence pattern that corresponds to the first-category historical searching character string, that comprises the character variable, and that is of an all variable type; and
        accumulating a quantity of generating times corresponding to a searching character variable sentence pattern that does not belong to the preset common searching sentence pattern set and that is of the all variable type in the generated searching character variable sentence pattern, and adding a searching character variable sentence pattern whose quantity of generating times reaches the first preset threshold of a quantity of times and that is of the all variable type to the preset common searching sentence pattern set.

3. The searching processing method according to claim 2, wherein the generating at least one searching character variable sentence pattern corresponding to each of the at least one historical searching character string according to a preset searching character variable set, accumulating a quantity of generating times corresponding to a searching character variable sentence pattern not belonging to the preset common searching sentence pattern set in the generated searching character variable sentence pattern, and adding a searching character variable sentence pattern whose quantity of generating times reaches a first preset threshold of a quantity of times to the preset common searching sentence pattern set further comprises:

determining a historical searching character string in which not each of the at least one segmentation character has a corresponding character variable in the at least one historical searching character string as a second-category historical searching character string, determining a segmentation character having no corresponding character variable in the second-category historical searching character string as a first segmentation character, and determining a segmentation character having a corresponding character variable in the second-category historical searching character string as a second segmentation character;

generating at least one searching character variable sentence pattern that corresponds to the second-category historical searching character string, that comprises the first segmentation character and the character variable corresponding to the second segmentation character, and that is of a non-all variable type;

accumulating a quantity of generating times corresponding to each of the at least one searching character variable sentence pattern of the non-all variable type, and adding a character variable corresponding to the first segmentation character to the searching character variable set or a newly created searching character variable set when a searching character variable sentence pattern whose quantity of generating times reaches a second preset threshold of a quantity of times exists in the at least one searching character variable sentence pattern of the non-all variable type; and generating at least one searching character variable sentence pattern that corresponds to the second-category historical searching character string, that comprises the character variable corresponding to the first segmentation character and the character variable corresponding to the second segmentation character, and that is of the all variable type, re-accumulating a quantity of generating times corresponding to a searching character variable sentence pattern that does not belong to the preset common searching sentence pattern set and that is of the all variable type in the generated searching character variable sentence pattern, and adding a searching character variable sentence pattern whose quantity of generating times reaches the first preset threshold of a quantity of times and that is of the all variable type to the preset common searching sentence pattern set.

4. The searching processing method according to claim 1, wherein the determining a searching character variable sentence pattern belonging to the preset common searching sentence pattern set in at least one searching character variable sentence pattern corresponding to the current searching character string as a target searching character variable sentence pattern comprises:

generating the at least one searching character variable sentence pattern corresponding to the current searching character string according to the searching character variable set;

detecting a quantity of searching character variable sentence patterns belonging to the preset common searching sentence pattern set in the at least one searching character variable sentence pattern corresponding to the current searching character string; and determining, when it is detected that the quantity of searching character variable sentence patterns belonging to the preset common searching sentence pattern set in the at least one searching character variable sentence pattern corresponding to the current searching character string is 1, the searching character variable sentence pattern belonging to the preset common searching sentence pattern set in the at least one searching character variable sentence pattern corresponding to the current searching character string as the target searching character variable sentence pattern, and sending the searching result data corresponding to the target searching character variable sentence pattern to the client.

5. The searching processing method according to claim 4, wherein the determining a searching character variable sentence pattern belonging to the preset common searching sentence pattern set in at least one searching character variable sentence pattern corresponding to the current searching character string as a target searching character variable sentence pattern further comprises:

determining a searching character variable sentence pattern having a largest quantity of generating times in the at least one searching character variable sentence pattern corresponding to the current searching character string as the target searching character variable sentence pattern when it is detected that the quantity of searching character variable sentence patterns belonging to the preset common searching sentence pattern set in the at least one searching character variable sentence pattern corresponding to the current searching character string is 0, and sending the searching result data corresponding to the target searching character variable sentence pattern to the client; or obtaining, when it is detected that the quantity of searching character variable sentence patterns belonging to the preset common searching sentence pattern set in the at least one searching character variable sentence pattern corresponding to the current searching character string is greater than 1, popularity rank information corresponding to each of the multiple searching character variable sentence patterns belonging to the preset common searching sentence pattern set in the at least one searching character variable sentence pattern corresponding to the current searching character string, determining a searching character variable sentence pattern having a highest popularity rank as the target searching character variable sentence pattern, and sending the searching result data corresponding to the target searching character variable sentence pattern to the client.

6. The searching processing method according to claim 1, further comprising:

obtaining all searching character variable sentence patterns in the preset common searching sentence pattern set and a preset to-be-determined sentence pattern set when a second preset time interval arrives, wherein the to-be-determined sentence pattern set is used to store a searching character variable sentence pattern that is not added to the preset common searching sentence pattern set; and re-collecting statistics on a new quantity of generating times corresponding to each of the all searching character variable sentence patterns according to all historical searching character strings collected within the second time interval, and deleting a searching character variable sentence pattern whose new quantity of generating times is less than a third preset threshold of a quantity of times.

7. A searching processing apparatus, comprising:
one or more processors;
and memory storing instructions, the instructions, when executed by the one or more processors cause the processors to perform operations comprising:
  obtaining, when a first preset time interval arrives, a plurality of historical searching character strings collected within the first time interval; and
  generating at least one searching character variable sentence pattern corresponding to each of the plurality of historical searching character strings according to a preset searching character variable set;
  accumulating a quantity of generating times corresponding to a searching character variable sentence pattern not belonging to a preset common searching sentence pattern set in the generated searching character variable sentence pattern;
  adding a searching character variable sentence pattern whose quantity of generating times reaches a first preset threshold of a quantity of times to the preset common searching sentence pattern set;
  obtaining a current searching character string sent by a client; and
  in response to the current searching character string:
    determining a searching character variable sentence pattern belonging to the preset common searching sentence pattern set in at least one searching character variable sentence pattern corresponding to the current searching character string as a target searching character variable sentence pattern,
    performing a search query against a database of search templates for media content, the search query including the target searching character variable sentence pattern, and
    sending searching result data corresponding to the target searching character variable sentence pattern to the client, the search result data including one or more content items matching the target searching character variable sentence pattern.

8. The searching processing apparatus according to claim 7, wherein the searching character variable set comprises at least one character variable, and each character variable comprises a searching character associated with the character variable; and
  the generating at least one searching character variable sentence pattern corresponding to each of the at least one historical searching character string according to a preset searching character variable set, accumulating a quantity of generating times corresponding to a searching character variable sentence pattern not belonging to the preset common searching sentence pattern set in the generated searching character variable sentence pattern, and adding a searching character variable sentence pattern whose quantity of generating times reaches a first preset threshold of a quantity of times to the preset common searching sentence pattern set comprises:
    recognizing the at least one historical searching character string according to the searching character in the searching character variable set, to split each historical searching character string into at least one segmentation character;
    determining a historical searching character string in which each of the at least one segmentation character has a corresponding character variable in the at least one historical searching character string as a first-category historical searching character string;
    generating, according to each character variable corresponding to the first-category historical searching character string, at least one searching character variable sentence pattern that corresponds to the first-category historical searching character string, that comprises the character variable, and that is of an all variable type; and
    accumulating a quantity of generating times corresponding to a searching character variable sentence pattern that does not belong to the preset common searching sentence pattern set and that is of the all variable type in the generated searching character variable sentence pattern, and adding a searching character variable sentence pattern whose quantity of generating times reaches the first preset threshold of a quantity of times and that is of the all variable type to the preset common searching sentence pattern set.

9. The searching processing apparatus according to claim 8, wherein the generating at least one searching character variable sentence pattern corresponding to each of the at least one historical searching character string according to a preset searching character variable set, accumulating a quantity of generating times corresponding to a searching character variable sentence pattern not belonging to the preset common searching sentence pattern set in the generated searching character variable sentence pattern, and adding a searching character variable sentence pattern whose quantity of generating times reaches a first preset threshold of a quantity of times to the preset common searching sentence pattern set further comprises:
    determining a historical searching character string in which not each of the at least one segmentation character has a corresponding character variable in the at least one historical searching character string as a second-category historical searching character string, determining a segmentation character having no corresponding character variable in the second-category historical searching character string as a first segmentation character, and determining a segmentation character having a corresponding character variable in the second-category historical searching character string as a second segmentation character;
    generating at least one searching character variable sentence pattern that corresponds to the second-category historical searching character string, that comprises the first segmentation character and the character variable corresponding to the second segmentation character, and that is of a non-all variable type;
    accumulating a quantity of generating times corresponding to each of the at least one searching character variable sentence pattern of the non-all variable type, and adding a character variable corresponding to the first segmentation character to the searching character variable set or a newly created searching character variable set when a searching character variable sentence pattern whose quantity of generating times reaches a second preset threshold of a quantity of times exists in the at least one searching character variable sentence pattern of the non-all variable type; and generating at least one searching character variable sentence pattern that corresponds to the second-category historical searching character string, that comprises the character variable corresponding to the first segmentation character and the character variable corresponding to the second segmentation character, and that is of the all variable type, re-accumulating a quantity of generating times corresponding to a searching character variable sentence pattern that does not belong to the preset common searching sentence pattern set and that is of the all variable type in the generated searching character variable sentence pattern, and adding a searching character variable sentence pattern whose quantity of generating times reaches the first preset threshold of a quantity of times and that is of the all variable type to the preset common searching sentence pattern set.

10. The searching processing apparatus according to claim 7, wherein the determining a searching character variable sentence pattern belonging to the preset common searching sentence pattern set in at least one searching character variable sentence pattern corresponding to the current searching character string as a target searching character variable sentence pattern comprises:

generating the at least one searching character variable sentence pattern corresponding to the current searching character string according to the searching character variable set;

detecting a quantity of searching character variable sentence patterns belonging to the preset common searching sentence pattern set in the at least one searching character variable sentence pattern corresponding to the current searching character string; and determining, when it is detected that the quantity of searching character variable sentence patterns belonging to the preset common searching sentence pattern set in the at least one searching character variable sentence pattern corresponding to the current searching character string is 1, the searching character variable sentence pattern belonging to the preset common searching sentence pattern set in the at least one searching character variable sentence pattern corresponding to the current searching character string as the target searching character variable sentence pattern, and sending the searching result data corresponding to the target searching character variable sentence pattern to the client.

11. The searching processing apparatus according to claim 10, wherein the determining a searching character variable sentence pattern belonging to the preset common searching sentence pattern set in at least one searching character variable sentence pattern corresponding to the current searching character string as a target searching character variable sentence pattern further comprises:

determining a searching character variable sentence pattern having a largest quantity of generating times in the at least one searching character variable sentence pattern corresponding to the current searching character string as the target searching character variable sentence pattern when it is detected that the quantity of searching character variable sentence patterns belonging to the preset common searching sentence pattern set in the at least one searching character variable sentence pattern corresponding to the current character string is 0, and sending the searching result data corresponding to the target searching character variable sentence pattern to the client; or obtaining, when it is detected that the quantity of searching character variable sentence patterns belonging to the preset common searching sentence pattern set in the at least one searching character variable sentence pattern corresponding to the current searching character string is greater than 1, popularity rank information corresponding to each of the multiple searching character variable sentence patterns belonging to the preset common searching sentence pattern set in the at least one searching character variable sentence pattern corresponding to the current searching character string, determining a searching character variable sentence pattern having a highest popularity rank as the target searching character variable sentence pattern, and sending the searching result data corresponding to the target searching character variable sentence pattern to the client.

12. The searching processing apparatus according to claim 7, wherein the processor is configured to invoke the device control application, and further perform the following steps:

obtaining all searching character variable sentence patterns in the preset common searching sentence pattern set and a preset to-be-determined sentence pattern set when a second preset time interval arrives, wherein the to-be-determined sentence pattern set is used to store a searching character variable sentence pattern that is not added to the preset common searching sentence pattern set; and re-collecting statistics on a new quantity of generating times corresponding to each of the all searching character variable sentence patterns according to all historical searching character strings collected within the second time interval, and deleting a searching character variable sentence pattern whose new quantity of generating times is less than a third preset threshold of a quantity of times.

13. A non-transitory computer-readable storage medium storing instructions, the instructions, when executed by one or more processors cause the processors to perform:

obtaining, when a first preset time interval arrives, a plurality of historical searching character strings collected within the first time interval;

generating at least one searching character variable sentence pattern corresponding to each of the plurality of historical searching character strings according to a preset searching character variable set;

accumulating a quantity of generating times corresponding to a searching character variable sentence pattern not belonging to a preset common searching sentence pattern set in the generated searching character variable sentence pattern;

adding a searching character variable sentence pattern whose quantity of generating times reaches a first preset threshold of a quantity of times to the preset common searching sentence pattern set;

obtaining a current searching character string sent by a client; and in response to the current searching character string:

determining a searching character variable sentence pattern belonging to the preset common searching sentence pattern set in at least one searching character variable sentence pattern corresponding to the current searching character string as a target searching character variable sentence pattern, performing a search query against a database of search templates for media content, the search query including the target searching character variable sentence pattern, and sending searching result data corresponding to the target searching character variable sentence pattern to the client, the search result data including one or more content items matching the target searching character variable sentence pattern.

14. The non-transitory computer-readable storage medium according to claim 13, wherein the searching character variable set comprises at least one character variable, and each character variable comprises a searching character associated with the character variable; and the generating at least one searching character variable sentence pattern corresponding to each of the at least one historical searching character string according to a preset searching character variable set, accumulating a quantity of generating times corresponding to a searching character variable sentence pattern not belonging to the preset common searching sentence pattern set in the generated searching character variable sentence pattern, and adding a searching character variable sentence pattern whose quantity of generating times reaches a first preset threshold of a quantity of times to the preset common searching sentence pattern set comprises:

recognizing the at least one historical searching character string according to the searching character in the searching character variable set, to split each historical searching character string into at least one segmentation character;

determining a historical searching character string in which each of the at least one segmentation character has a corresponding character variable in the at least one historical searching character string as a first-category historical searching character string;

generating, according to each character variable corresponding to the first-category historical searching character string, at least one searching character variable sentence pattern that corresponds to the first-category historical searching character string, that comprises the character variable, and that is of an all variable type; and accumulating a quantity of generating times corresponding to a searching character variable sentence pattern that does not belong to the preset common searching sentence pattern set and that is of the all variable type in the generated searching character variable sentence pattern, and adding a searching character variable sentence pattern whose quantity of generating times reaches the first preset threshold of a quantity of times and that is of the all variable type to the preset common searching sentence pattern set.

15. The non-transitory computer-readable storage medium according to claim 14, wherein the generating at least one searching character variable sentence pattern corresponding to each of the at least one historical searching character string according to a preset searching character variable set, accumulating a quantity of generating times corresponding to a searching character variable sentence pattern not belonging to the preset common searching sentence pattern set in the generated searching character variable sentence pattern, and adding a searching character variable sentence pattern whose quantity of generating times reaches a first preset threshold of a quantity of times to the preset common searching sentence pattern set further comprises:

determining a historical searching character string in which not each of the at least one segmentation character has a corresponding character variable in the at least one historical searching character string as a second-category historical searching character string, determining a segmentation character having no corresponding character variable in the second-category historical searching character string as a first segmentation character, and determining a segmentation character having a corresponding character variable in the second-category historical searching character string as a second segmentation character;

generating at least one searching character variable sentence pattern that corresponds to the second-category historical searching character string, that comprises the first segmentation character and the character variable corresponding to the second segmentation character, and that is of a non-all variable type;

accumulating a quantity of generating times corresponding to each of the at least one searching character variable sentence pattern of the non-all variable type, and adding a character variable corresponding to the first segmentation character to the searching character variable set or a newly created searching character variable set when a searching character variable sentence pattern whose quantity of generating times reaches a second preset threshold of a quantity of times exists in the at least one searching character variable sentence pattern of the non-all variable type; and generating at least one searching character variable sentence pattern that corresponds to the second-category historical searching character string, that comprises the character variable corresponding to the first segmentation character and the character variable corresponding to the second segmentation character, and that is of the all variable type, re-accumulating a quantity of generating times corresponding to a searching character variable sentence pattern that does not belong to the preset common searching sentence pattern set and that is of the all variable type in the generated searching character variable sentence pattern, and adding a searching character variable sentence pattern whose quantity of generating times reaches the first preset threshold of a quantity of times and that is of the all variable type to the preset common searching sentence pattern set.

16. The non-transitory computer-readable storage medium according to claim 13, wherein the determining a searching character variable sentence pattern belonging to the preset common searching sentence pattern set in at least one searching character variable sentence pattern corresponding to the current searching character string as a target searching character variable sentence pattern comprises:

generating the at least one searching character variable sentence pattern corresponding to the current searching character string according to the searching character variable set;

detecting a quantity of searching character variable sentence patterns belonging to the preset common searching sentence pattern set in the at least one searching character variable sentence pattern corresponding to the current searching character string; and determining, when it is detected that the quantity of searching character variable sentence patterns belonging to the preset common searching sentence pattern set in the at least one searching character variable sentence pattern corresponding to the current searching character string is 1, the searching character variable sentence pattern belonging to the preset common searching sentence pattern set in the at least one searching character variable sentence pattern corresponding to the current searching character string as the target searching character variable sentence pattern, and sending the searching result data corresponding to the target searching character variable sentence pattern to the client.

17. The non-transitory computer-readable storage medium according to claim 16, wherein the determining a searching character variable sentence pattern belonging to the preset common searching sentence pattern set in at least one searching character variable sentence pattern corresponding to the current searching character string as a target searching character variable sentence pattern further comprises:

determining a searching character variable sentence pattern having a largest quantity of generating times in the at least one searching character variable sentence pattern corresponding to the current searching character string as the target searching character variable sentence pattern when it is detected that the quantity of searching character variable sentence patterns belonging to the preset common searching sentence pattern set in the at least one searching character variable sentence pattern corresponding to the current searching character string is 0, and sending the searching result data corresponding to the target searching character variable sentence pattern to the client; or obtaining, when it is detected that the quantity of searching character variable sentence patterns belonging to the preset common searching sentence pattern set in the at least one searching character variable sentence pattern corresponding to the current searching character string is greater than 1, popularity rank information corresponding to each of the multiple searching character variable sentence patterns belonging to the preset common searching sentence pattern set in the at least one searching character variable sentence pattern corresponding to the current searching character string, determining a searching character variable sentence pattern having a highest popularity rank as the target searching character variable sentence pattern, and sending the searching result data corresponding to the target searching character variable sentence pattern to the client.

* * * * *